(12) United States Patent
Howard

(10) Patent No.: US 11,476,452 B2
(45) Date of Patent: Oct. 18, 2022

(54) STACK FOR AN ENERGY STORAGE DEVICE

(71) Applicant: Dyson Technology Limited, Wiltshire (GB)

(72) Inventor: Joseph Daniel Howard, Swindon (GB)

(73) Assignee: Dyson Technology Limited, Malmesbury (GB)

( * ) Notice: Subject to any disclaimer, the term of this patent is extended or adjusted under 35 U.S.C. 154(b) by 0 days.

(21) Appl. No.: 17/261,528

(22) PCT Filed: Jul. 19, 2019

(86) PCT No.: PCT/GB2019/052029
§ 371 (c)(1),
(2) Date: Jan. 19, 2021

(87) PCT Pub. No.: WO2020/016599
PCT Pub. Date: Jan. 23, 2020

(65) Prior Publication Data
US 2021/0265611 A1    Aug. 26, 2021

(30) Foreign Application Priority Data

Jul. 20, 2018 (GB) ..................................... 1811888

(51) Int. Cl.
*H01M 4/04* (2006.01)
*H01M 10/04* (2006.01)
(Continued)

(52) U.S. Cl.
CPC ....... *H01M 4/0407* (2013.01); *H01M 4/0423* (2013.01); *H01M 10/04* (2013.01);
(Continued)

(58) Field of Classification Search
CPC .... H01M 4/04; H01M 4/0407; H01M 4/0423; H01M 4/139; H01M 6/40; H01M 10/04;
(Continued)

(56) References Cited

U.S. PATENT DOCUMENTS

| 4,758,526 A | 7/1988 | Thalheimer |
| 5,445,906 A | 8/1995 | Hobson et al. |

(Continued)

FOREIGN PATENT DOCUMENTS

| EP | 2491601 B1 | 11/2016 |
| JP | H4-116986 A | 4/1992 |

(Continued)

OTHER PUBLICATIONS

Office Action received for Japanese Patent Application No. 2021-503001, dated Jan. 18, 2022, 6 pages (3 pages of English Translation and 3 pages of Original Document).

(Continued)

*Primary Examiner* — Brian K Talbot
(74) *Attorney, Agent, or Firm* — Faegre Drinker Biddle & Reath LLP

(57) ABSTRACT

A method comprises obtaining a stack for an energy storage device, the stack comprising a first electrode layer and an electrolyte layer. The method comprises depositing a first material over an exposed portion of the first electrode layer and an exposed portion of the electrolyte layer. The method comprises depositing a second material over the first material and to form a second electrode layer of the stack, and to provide an electrical connection from the second electrode layer, for connecting to a further such second electrode layer via the second material. The electrolyte layer is between the first electrode layer and the second electrode layer. The first material insulates the exposed portions of the first electrode layer and the electrolyte layer from the second material. Also (Continued)

disclosed is an apparatus for maintaining top-down inkjet material deposition.

6 Claims, 5 Drawing Sheets

(51) Int. Cl.
| | |
|---|---|
| H01M 10/058 | (2010.01) |
| H01M 6/40 | (2006.01) |
| H01M 4/139 | (2010.01) |
| H01M 10/0562 | (2010.01) |
| H01M 10/0583 | (2010.01) |
| H01M 10/0585 | (2010.01) |

(52) U.S. Cl.
CPC .............. *H01M 4/139* (2013.01); *H01M 6/40* (2013.01); *H01M 10/058* (2013.01); *H01M 10/0562* (2013.01); *H01M 10/0583* (2013.01); *H01M 10/0585* (2013.01)

(58) Field of Classification Search
CPC ........... H01M 10/058; H01M 10/0562; H01M 10/0585; H01M 10/0583
USPC ..................................................... 427/79, 115
See application file for complete search history.

(56) References Cited

U.S. PATENT DOCUMENTS

| | | | |
|---|---|---|---|
| 6,323,056 B1 | 11/2001 | Miyoshi | |
| 9,478,797 B2* | 10/2016 | Li | H01M 4/386 |
| 2003/0190520 A1* | 10/2003 | Amine | H01M 10/052 |
| | | | 429/210 |
| 2004/0126655 A1 | 7/2004 | Ohsawa et al. | |
| 2005/0141170 A1* | 6/2005 | Honda | C23C 14/042 |
| | | | 429/162 |
| 2007/0079866 A1 | 4/2007 | Borden et al. | |
| 2010/0190051 A1 | 7/2010 | Aitken | |
| 2011/0139216 A1* | 6/2011 | Lee | H01L 31/077 |
| | | | 257/E31.043 |
| 2012/0115018 A1* | 5/2012 | Kawaoka | H01M 10/052 |
| | | | 429/162 |
| 2014/0212735 A1* | 7/2014 | Li | H01M 10/0436 |
| | | | 429/231.8 |
| 2015/0010717 A1* | 1/2015 | Nieh | C23C 14/35 |
| | | | 427/555 |
| 2015/0333314 A1* | 11/2015 | Pirk | H01M 6/40 |
| | | | 429/246 |
| 2017/0104191 A1 | 4/2017 | Peuchert et al. | |
| 2019/0115627 A1* | 4/2019 | Rendall | H01G 11/72 |
| 2019/0148079 A1* | 5/2019 | Frank | H01M 10/04 |
| | | | 361/524 |
| 2019/0165342 A1* | 5/2019 | Berland | H01M 50/183 |
| 2020/0313229 A1* | 10/2020 | Haga | H01M 10/0525 |
| 2020/0365871 A1* | 11/2020 | Smithyman | H01M 10/4257 |

FOREIGN PATENT DOCUMENTS

| | | |
|---|---|---|
| JP | 2016-507875 A | 3/2016 |
| KR | 10-1039149 B1 | 6/2011 |
| WO | 2014/062676 A1 | 4/2014 |
| WO | 2014/116522 A1 | 7/2014 |
| WO | WO 2014/116522 * | 7/2014 |

OTHER PUBLICATIONS

International Search Report and Written Opinion dated Sep. 16, 2019, directed to International Application No. PCT/GB2019/052029; 12 pages.

Search Report dated Sep. 19, 2018, directed to GB Application No. 1811888.5; 2 pages.

\* cited by examiner

STACK FOR AN ENERGY STORAGE DEVICE

REFERENCE TO RELATED APPLICATIONS

This application is a national stage application under 35 U.S.C. 371 of International Application No. PCT/GB2019/052029, filed Jul. 19, 2019, which claims the priority of United Kingdom Application No. 1811888.5, filed Jul. 20, 2018, the entire contents of each of which are incorporated herein by reference.

FIELD OF THE DISCLOSURE

The present disclosure relates to a stack for an energy storage device, and, more specifically, although not exclusively, to methods and apparatus for processing a stack for an energy storage device.

BACKGROUND OF THE DISCLOSURE

A known method of producing energy storage devices such as solid-state thin film cells comprising layers of electrodes, electrolyte and current collectors is to first form a stack comprising a first current collecting layer formed on a substrate, an electrode layer, an electrolyte layer, a second electrode layer and a second current collecting layer. The stack is then cut into separate sections to form individual cells. Each cell can then be coated with a protective layer, for example, in order to prevent passivation of the layers and possible shorts.

In order to form an electrical connection with the cell, for example in order to electrically connect current collectors of multiple cells stacked one on top of another, part of the protective layer may be removed, for example by etching. Alternatively, a mask can be applied prior to the coating process to ensure that a portion of each current collector is left exposed.

However, known formation and processing of stacks for energy storage devices such as solid-state thin film cells can be inefficient, making effective commercialisation difficult. It is therefore desirable to provide efficient methods for forming and processing of a stack for an energy storage device.

SUMMARY OF THE DISCLOSURE

According to some embodiments of the present disclosure, there is provided a method comprising: obtaining a stack for an energy storage device, the stack comprising a first electrode layer and an electrolyte layer; depositing a first material over an exposed portion of the first electrode layer and an exposed portion of the electrolyte layer; and depositing a second material over the first material and to form a second electrode layer of the stack, and to provide an electrical connection from the second electrode layer, for connecting to a further such second electrode layer via the second material, wherein the electrolyte layer is between the first electrode layer and the second electrode layer; whereby the first material insulates the exposed portions of the first electrode layer and the electrolyte layer from the second material.

Depositing the second material over the first material and to form and provide a connection from the second electrode layer may allow for efficient and/or reliable connection of cells formed from the stack in parallel, and hence, for example, for the efficient production of an energy storage device therefrom.

In some embodiments, depositing the first material comprises inkjet material deposition of the first material. Depositing the first material by inkjet material deposition, such as inkjet printing, may allow flexible, efficient, and/or reliable deposition of the first material. For example, inkjet printing may be performed at relatively low (e.g. ambient) temperatures and/or pressures, for example as compared to thermal spray coating, and hence may allow for economic and/or efficient deposition and hence cell production.

In some embodiments, the stack comprises a substrate proximal to one of the first electrode layer and the second electrode layer, wherein the other of the first electrode layer and the second electrode layer is an anode layer. Having the stack in this configuration may allow for anode material to be used as the second material, which may provide for efficient energy storage device production.

In some embodiments, the second material is anode material for forming the anode layer. For example, the anode material may be relatively inexpensive. For example, the anode material may be inexpensive as compared to conductive inks and/or compared to cathode material. Therefore, providing an electrical connection for the anode layer to other such anode layers of further cells using anode material may allow for the cost of the cell production to be reduced, and hence may allow for more efficient cell production. As another example, the deposition of anode material, for example by flood deposition, may be relatively fast/or and inexpensive, for example, as compared to inkjet printing.

In some embodiments, the first electrode layer and the electrolyte layer are recessed from the substrate so that the substrate provides a ledge portion on which the first material and/or the second material is/are at least partially supported. Having a ledge portion may allow for the first material and/or the second material to be supported during and/or after deposition, and/or may prevent or reduce unwanted migration of the first material and/or second material, which may in turn facilitate the accurate deposition of the first material and/or the second material.

In some embodiments, the further such second electrode layer is of a further such stack. This may provide for separate cells, formed from the stacks, to be connected in parallel. Connecting cells in parallel may provide for an energy storage device having relatively large discharge rates, which may be useful in some applications.

In some embodiments, the stack comprises a said further second electrode layer, and a further electrolyte layer between the further second electrode layer electrode layer and the first electrode layer, wherein depositing the first material further comprises depositing the first material over an exposed portion of the further electrolyte layer, and wherein depositing the second material further comprises depositing the second material to contact the further second electrode layer, thereby to connect the second electrode layer and the further second electrode layer via the second material, whereby the first material further insulates the exposed portion of the further electrolyte layer from the second material. Such a stack arrangement may provide for layers that constitute multiple cells on one substrate. This may be an efficient arrangement as it may allow for the amount of substrate, anode and/or cathode material required to form multiple cells to be reduced.

In some embodiments, the electrolyte layer, the first electrode layer and the first further electrolyte layer are recessed from the further second electrode layer such that the further second electrode layer provides a ledge on which the first material and/or the second material is/are supported. Having a ledge portion may allow for the first material and/or the second material to be supported during and/or after deposition, and/or may prevent or reduce unwanted migration of the first material and/or second material, which may in turn facilitate the accurate deposition of the first material and/or the second material.

In some embodiments, the method comprises laser ablating the stack, and one or more of the exposed portions are exposed by the laser ablating of the stack. Laser ablating may provide an effective, reliable, rapid and efficient way to expose the portions of the stack to allow for the connection of the cells formed therefrom, and hence may, in turn, provide for efficient energy storage device production.

According to some embodiments of the present disclosure, there is provided a stack for an energy storage device, the stack comprising a first electrode layer, a second electrode layer, and an electrolyte layer between the first electrode layer and the second electrode layer, the stack comprising a first material over a portion of the first electrode layer and a portion of the electrolyte layer; and a second material over the first material and forming the second electrode layer, and to provide an electrical connection from the second electrode layer, for connecting to a further such second electrode layer via the second material, wherein the first material insulates the portions of the first electrode layer and the electrolyte layer from the second material.

According to some embodiments of the present disclosure, there is provided an energy storage device formed according to methods described herein.

There is also provided apparatus comprising: a first inkjet material deposition component arranged to deposit a material over a first side of a stack for an energy storage device; a second inkjet material deposition component arranged to deposit a material over a second side of the stack, the second side being opposite to the first side; and a plurality of rollers arranged to guide movement of the stack between the first inkjet material deposition component and the second inkjet material deposition component such that the first side of the stack is presented for top-down inkjet material deposition of the material onto the stack from the first inkjet material deposition component and such that the second side of the stack is presented for top-down inkjet material deposition of the material onto the stack from the second inkjet material deposition component.

Performing the ink-jet material deposition, such as ink-jet printing, top-down may allow for accurate and efficient deposition of the material onto the stack. Ensuring that both sides of a stack are presented for top-down printing may allow for the accurate and efficient deposition of material onto the stack even in the case of stacks comprising layers on both sides of a substrate.

In some embodiments, the apparatus is arranged to perform the method according to some embodiments described herein.

Further features and advantages of the disclosure will become apparent from the following description of preferred embodiments of the disclosure, given by way of example only, which is made with reference to the accompanying drawings.

DETAILED DESCRIPTION OF THE DISCLOSURE

Details of methods, structures and devices according to some embodiments will become apparent from the following description, with reference to the Figures. In this description, for the purpose of explanation, numerous specific details of certain examples/embodiments are set forth. Reference in the specification to "an example," "an embodiment," or similar language means that a particular feature, structure, or characteristic described in connection with the example/embodiment is included in at least that one example/embodiment, but not necessarily in other examples/embodiments. It should further be noted that certain examples/embodiments are described schematically with certain features omitted and/or necessarily simplified for ease of explanation and understanding of the concepts underlying the examples/embodiments.

Figure 1:
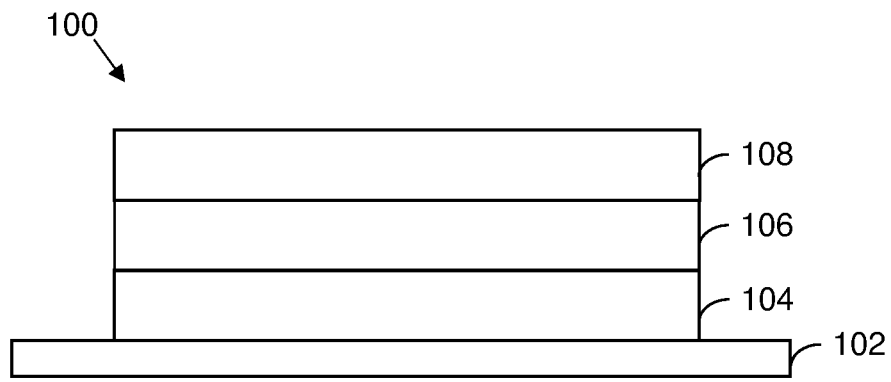
FIG. 1 is a schematic diagram that illustrates a stack for an energy storage device according to some embodiments.

FIG. 1 shows a stack 100 of layers for an energy storage device. The stack 100 of FIG. 1 may be used as part of a thin film energy storage device having a solid electrolyte, for example.

The stack 100 comprises a substrate 102, a cathode layer 104, an electrolyte layer 106 and an anode layer 108. In the example of FIG. 1, the anode layer 108 is further from the substrate 102 than the cathode layer 104, and the electrolyte layer 106 is between the cathode layer 104 and the anode layer 108. The substrate 102 contacts the cathode layer 104 and supports the stack. While in this example the substrate 102 contacts the cathode layer 104, in other examples there may be additional layers (not shown) in between the substrate 102 and the cathode layer 104.

In some embodiments, the substrate 102 may be or comprise nickel foil; but it will be appreciated that any suitable metal could be used, such as aluminium, copper or steel, or a metallised material including metallised plastics such as aluminium on polyethylene terephthalate (PET). In some embodiments, the substrate 102 may not be metallic and/or may not conduct electrical current. For example, in some embodiments, the substrate may be polyethylene terephthalate (PET).

The cathode layer 104 may act as a positive current collecting layer. The cathode layer 104 may form a positive electrode layer (i.e. that corresponds to a cathode during discharge of a cell of an energy storage device including the stack 100). The cathode layer 104 may comprise a material which is suitable for storing Lithium ions by virtue of stable chemical reactions, such as Lithium Cobalt Oxide, Lithium Iron Phosphate or alkali metal polysulphide salts.

The anode layer 108 may act as a negative current collecting layer. The anode layer 108 may form a negative electrode layer (i.e. that corresponds to an anode during discharge of a cell of the energy storage device including the stack 100). The anode layer 108 may comprise a Lithium metal, Graphite, Silicon or Indium Tin Oxides.

In some embodiments, the anode layer 108 may comprise a negative current collector and a separate negative electrode layer (not shown). In these embodiments, the negative electrode layer may comprise a Lithium metal, Graphite, Silicon or Indium Tin Oxides, and/or the negative current collector may comprise nickel foil. However, it will be appreciated that any suitable metal could be used, such as aluminium, copper or steel, or a metallised material including metallised plastics such as aluminium on polyethylene terephthalate (PET).

The electrolyte layer 106 may include any suitable material which is ionically conductive, but which is also an electrical insulator such as lithium phosphorous oxynitride (LiPON). The electrolyte layer 106 may be a solid layer, and may be referred to as a fast ion conductor. A solid electrolyte layer may have structure which is intermediate between that of a liquid electrolyte, which for example lacks a regular structure and includes ions which may move freely, and that of a crystalline solid. A crystalline material for example has a regular structure, with an ordered arrangement of atoms, which may be arranged as a two-dimensional or three-dimensional lattice. Ions of a crystalline material are typically immobile and may therefore be unable to move freely throughout the material.

The stack 100 may for example be manufactured by depositing the cathode layer 104 on the substrate 102. The electrolyte layer 106 is subsequently deposited on the cathode layer 104, and the anode layer 108 is then deposited on the electrolyte layer 106. Each layer of the stack 100 may be deposited by flood deposition, which provides a simple and effective way of producing a highly homogenous layer, although other deposition methods are possible.

The stack 100 of FIG. 1 may undergo processing to manufacture an energy storage device.

Figure 2:
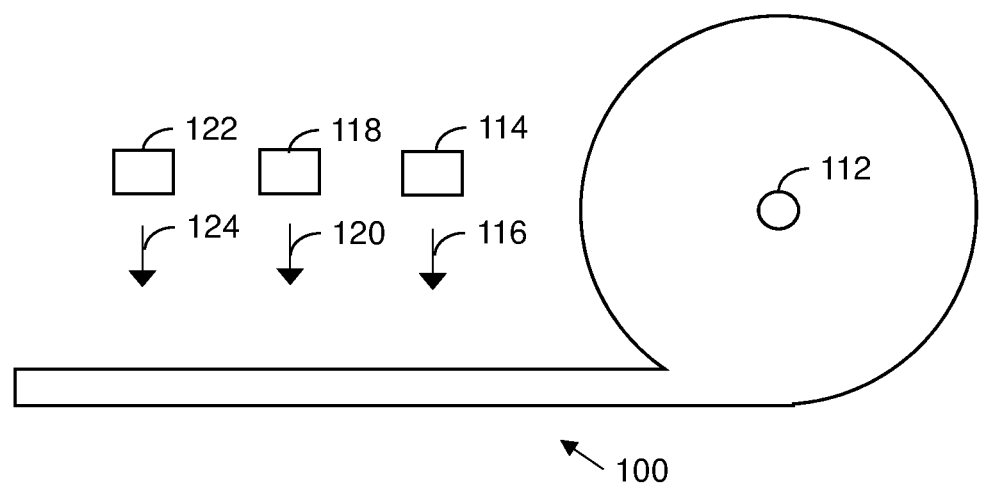
FIG. 2 is a schematic diagram that illustrates one way of processing the stack of FIG. 1 for the manufacture of an energy storage device according to some embodiments.

A general overview of an example of processing that may be applied to the stack 100 of FIG. 1 is illustrated schematically in FIG. 2.

In FIG. 2, the stack 100 is processed for the manufacture of an energy storage device. The stack 100 in this example is flexible, allowing it to be wound around a roller 112, for example, as part of a roll-to-roll manufacturing process (sometimes referred to as a reel-to-reel manufacturing process). The stack 100 may be gradually unwound from the roller 112 and subjected to processing.

In the example of FIG. 2, cuts or grooves may be formed in the stack 100 using a first laser 114. The first laser 114 is arranged to apply laser beams 116 to the stack 100 to remove portions of the stack 100 by laser ablation, thereby forming the cuts or grooves.

After formation of the cuts or grooves, electrically insulating material may be introduced into or into the region of at least some of the cuts or grooves using an insulating material system 118. An electrically insulating material may be considered to be electrically non-conductive and may therefore conduct a relatively a small amount of electric current when subjected to an electric field. Typically, electrically insulating material (sometimes referred to as an insulator) conducts less electric current than semiconducting materials or electrically conductive materials. However, a small amount of electric current may nevertheless flow through an electrically insulating material under the influence of an electric field, as even an insulator may include a small amount of charge carriers for carrying electric current. In some embodiments herein, a material may be considered to be electrically insulating where it is sufficiently electrically insulating to perform the function of an insulator. This function may be performed for example where the material insulates one element from another sufficiently for short-circuits to be avoided.

Referring to FIG. 2, after introduction of the electrically insulating material, the stack 110 is cut to form separate cells for an energy storage device. In some embodiments, hundreds and potentially thousands of cells can be cut from a roll of the stack 100, allowing multiple cells to be manufactured in an efficient manner.

In FIG. 2, the cutting operation is performed using a second laser 122, which is arranged to apply laser beams 124 to the stack 100. Each cut may for example be through the centre of an insulating plug such that the plug is split into two pieces, each piece forming a protective covering over exposed surfaces including edges, to which it has attached.

Although not shown in FIG. 2 (which is merely schematic), it is to be appreciated that, after introduction of the insulating material (or otherwise), the stack may be folded back on itself to create a z-fold arrangement having for example tens, possibly hundreds, and potentially thousands, of layers with each of the insulating plugs aligned. The laser cutting process performed by the second laser 122 may then be used to cut through the z-fold arrangement in a single cutting operation for each of the aligned sets of plugs.

After cutting the cells, electrical connectors can be provided along opposite sides of a cell, such that a first electrical connector on one side of the cell contacts the cathode layer(s) 104, but is prevented from contacting the other layers by the electrically insulating material. Similarly, a second electrical connector on an opposite side of the cell can be arranged in contact with the anode layer(s) 108, but is prevented from contacting the other layers by the insulating material. The insulating material may therefore reduce the risk of a short-circuit between the anode and cathode layers 104, 108, and the other layers in each cell. The first and second electrical connectors may, for example, comprise a metallic material that is applied to edges of the stack 100. The cells can therefore be joined in parallel in an efficient manner.

The foregoing description provides a general overview of an example of a stack 100 for an energy storage device, as well as an example of processing that may be applied to the stack 100, for example for the production of an energy storage device. The following description provides example methods and apparatuses for forming and/or processing a stack (which may be the same as or similar to the stack 100 described with reference to FIG. 1), which may provide for improvements in efficiency in the formation and processing of the stack 200 and, hence, for the efficient production of an energy storage device such as a cell produced therefrom.

Figure 3:
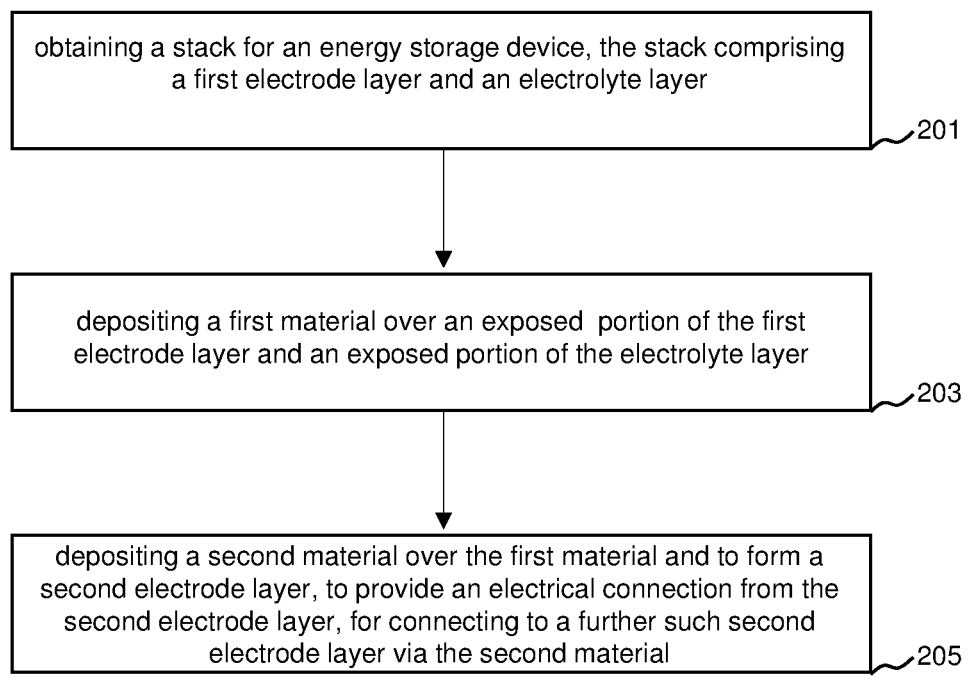
FIG. 3 is a flow diagram that illustrates a method of processing a stack according to some embodiments.

Referring to FIG. 3, there is illustrated schematically a method of processing an energy storage device stack 200 according to an example.

In broad overview the method comprises, in step 201, obtaining a stack for an energy storage device, the stack comprising a first electrode layer and an electrolyte layer. The method further comprises, in step 203, depositing a first material over an exposed portion, e.g. surface, of the first electrode layer and an exposed portion, e.g. surface, of the electrolyte layer. The method further comprises, in step 205, depositing a second material over the first material and to form a second electrode layer of the stack, to provide an electrical connection from the second electrode layer, for connecting to a further such second electrode layer via the second material. The electrolyte layer is between the first electrode layer and the second electrode layer. The first material insulates the exposed portions, e.g. surfaces, of the first electrode layer and the electrolyte layer from the second material.

As explained in more detail hereafter, the method may allow for efficient and/or reliable connection of cells for an energy storage device in parallel, and hence, for example, for the efficient production of an energy storage device.

Figure 4:
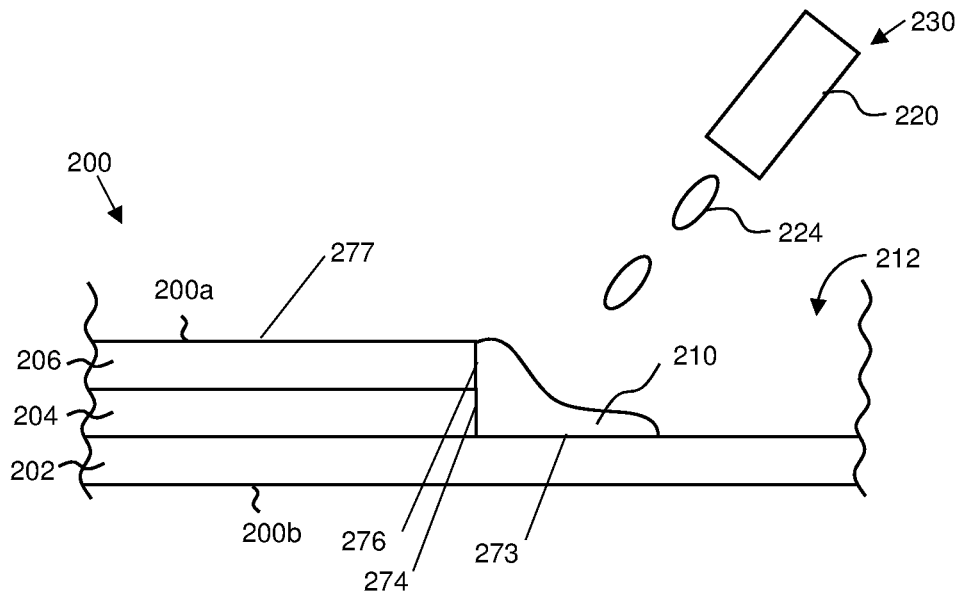
FIGS. 4 and 5 are schematic diagrams that illustrate one way of processing a stack according to some embodiments.
Figure 5:
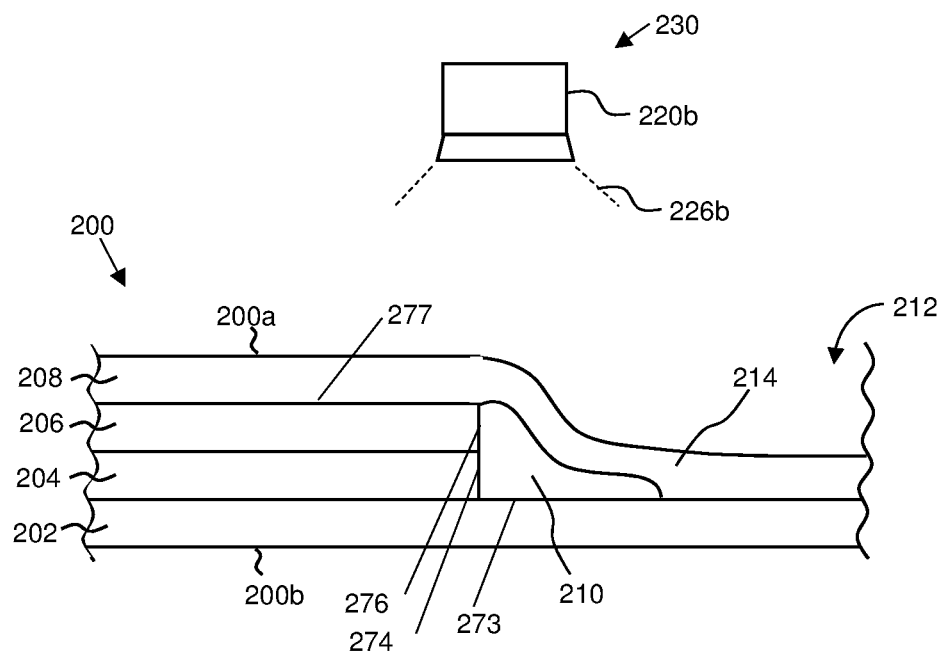

Referring now to FIGS. 4 and 5, there is illustrated schematically a stack 200 (i.e. that may be obtained in accordance with examples of step 201 of the method described with reference to FIG. 3) according to a first example.

The stack 200 may be similar to the stack 100 described with reference to FIG. 1. However, the stack 200 of FIG. 4 does not yet comprise an anode layer. More specifically, in the example illustrated in FIG. 4, the energy storage device stack 200 comprises a substrate layer 202, a cathode layer 204, and an electrolyte layer 206, (but not, at this stage, an anode layer, but see anode layer 208 of FIG. 5).

In the example illustrated in FIGS. 4 and 5, the first electrode layer 204 is the cathode layer 204, and the second electrode layer 208 is the anode layer 208. The layers 202-208 of the stack 200 may be the same as or similar to the layers of the stack 100 described with reference to FIG. 1. For example, the cathode layer 204 may comprise a cathode electrode and a cathode current collector (not shown in FIG. 4) and the anode layer 208 may comprise an anode electrode and an anode current collector (not shown in FIG. 4). In the example illustrated in FIGS. 4 and 5, the electrolyte layer 206 is between the cathode layer 204 and the anode layer 208 (once this is formed), the cathode layer 204 is adjacent to the substrate layer 202, the electrolyte layer 206 is adjacent to the cathode layer 204, and the anode layer 208 (once this is formed) is adjacent to the electrolyte layer 206. In this example, the substrate layer 202 is proximal to the cathode layer 204 relative to the anode layer 208. In this example, the substrate layer 202 may be or comprise a non-electrically conducting material such as polyethylene terephthalate (PET), although other materials may be used.

As illustrated in FIG. 4, the energy storage device stack 200 has a cut 212 formed therein. The cut 212 may be formed in the stack 200 by laser ablation (not shown). The cut 212 is formed into a first side 200a of the stack 200, distal from the substrate layer 202. As illustrated in FIG. 4, the cut 212 is formed through the electrolyte layer 206 and the cathode layer 204, but not the substrate layer 202. The laser ablation forming the cut may expose portions, such as surfaces (e.g. edges) 273, 274, 276, of the substrate, cathode, and electrolyte layers 202, 204, 206.

In some embodiments, and as illustrated in FIGS. 4 and 5, the cut 212 is bounded only by the exposed portions 274, 276 (which in this example may also be thought of as side portions of the cut 212) of the cathode and electrolyte layers 204, 206, and by an exposed portion, e.g. ledge 273, of the substrate layer 202 (which in this example may also be thought of as forming a base or a bottom surface of the cut 212). For example, the stack 200 may represent a segmented cell for an energy storage device, for example that has been segmented from a larger stack structure (not shown). In these embodiments, the portion of the stack 200 schematically illustrated in FIGS. 4 and 5 may be an end portion of a terminal of a cell. In other words, in these examples, the stack 200 may terminate (i.e. not continue) at the right-hand side of FIGS. 4 and 5. It is to be appreciated that, in some examples, the stacks of each of the examples described herein with reference to FIGS. 4 to 8 may be arranged in this way.

However, in other embodiments, the cut 212 may be in the form of a groove. In cases where the cut 212 is a groove, FIGS. 4 and 5 may be thought of as only showing the left-hand side of the groove. As used herein, the term "groove" may refer to a channel, slot or trench that may be continuous or non-continuous, and may in some examples be elongate, and which may extend only part way through the layers 202-206 of the stack 200. For example, the groove may be bounded on a first side by exposed portions 274, 276 of the cathode and electrolyte layers 204, 206 (which in this example may also be thought of as first side portions of the groove) on a second side by the exposed ledge 273 of the substrate layer 202 (which in this example may also be thought of as forming a base or a bottom surface of the groove), and on a third side by (similarly to the first side) further exposed portions, e.g. surfaces, (not shown) of cathode and electrolyte layers (nots shown) of the stack 200 (which in this example may also be thought of as second side portions of the groove). One or more such grooves 212 may be formed to segment the stack 200 into partial cell structures, but without (at this stage) completely separating those individual cell structures. It is to be appreciated that, in some embodiments, the stacks of each of the examples described herein with reference to FIGS. 4 to 8 may be arranged in this way.

In some embodiments where the cut 212 is a groove, the (or each) groove may have a depth that extends into the stack 200 in a direction substantially perpendicular to the plane of the layers 202-206; a width substantially perpendicular to the depth (the width and depth of each groove are in the plane of the page in the sense of FIG. 4), and a length that extends in a direction substantially parallel to the plane of the layers 202-208 and substantially perpendicular to the width (i.e. into the plane of the page in the sense of FIG. 4). Where that are plural first grooves, they may be substantially parallel to one another in both the depth and length directions. It will therefore be appreciated that although a cut 212 will be referred to in the following, in each of the examples described herein, the cut 212 may take the form of a groove, and that in some examples there may be a plurality of such grooves formed in the stack 200.

In either case, as a result of the cut 212, as illustrated in FIG. 4, the first electrode layer (in this example the cathode layer 204) and the electrolyte layer 206 are recessed from the substrate layer 202 so that the substrate layer 202 provides a ledge portion, e.g. surface, 273, for example on which first material 210 and/or second material 214 may be at least partially supported.

It should be noted that FIG. 4 (similarly to the other Figures) is a schematic diagram for illustrative purposes only. For example, the dimensions and relative spacings of the features illustrated in FIG. 4 (e.g. the layers 202-206, the cut 212 or groove) are schematic only and merely serve to illustrate example structures and processes described herein.

As used herein, "laser ablation" may refer to the removal of material from the stack 200 using a laser-based process. This removal of material may comprise any one of multiple physical processes. For example the removal of material may comprise (without limitation) any one or combination of melting, melt-expulsion, vaporisation (or sublimation), photonic decomposition (single photon), photonic decomposition (multi-photon), mechanical shock, thermo-mechanical shock, other shock-based processes, surface plasma machining, and removal by evaporation (ablation).

Referring specifically to FIG. 4, a first material 210 is being deposited over the exposed portion, e.g. surface, 274 of the first electrode layer (in this example the cathode layer 202) and an exposed portion, e.g. surface, 276 of the electrolyte layer 206 (in accordance with examples of step 203 of the method described with reference to FIG. 3).

The first material 210 is an electrically insulating material. An electrically insulating material may be considered to be electrically non-conductive and may therefore conduct a relatively a small amount of electric current when subjected to an electric field. Typically, electrically insulating material (sometimes referred to as an insulator) conducts less electric current than semiconducting materials or electrically conductive materials. However, a small amount of electric current may nevertheless flow through an electrically insulating material under the influence of an electric field, as even an insulator may include a small amount of charge carriers for carrying electric current. In some embodiments herein, a material may be considered to be electrically insulating where it is sufficiently electrically insulating to perform the function of an insulator. This function may be performed for example where the material insulates sufficiently for short-circuits to be avoided.

In the example illustrated in FIG. 4, the first (insulating) material 210 is deposited by inkjet material deposition. That is, in this example, deposition of the first material 210 uses inkjet technology for accurately depositing the first material 210 as droplets 224. In this example, the first material 210 is deposited in the form of ink by inkjet printing. The ink cures to form a solid material. However, it will be appreciated that in other examples, the first material may be deposited in a form other than ink, but may nonetheless be deposited using inkjet technology.

As mentioned, in this example, the first material is deposited by inkjet printing. That is, in this example, depositing the first material 210 comprises inkjet printing the first material 210. In this example, insulating ink is inkjet printed from an inkjet printing component, e.g. nozzle 220 of a deposition apparatus 230. The nozzle 220 prints droplets 224 of the insulating ink over the exposed portion 274 of the cathode layer 204 and the exposed portion 276 of the electrolyte layer 206.

In this example, the inkjet printing of the first material 210 is performed top-down. In other words, in this example, the droplets 224 travel from the nozzle 220 to the stack 200 with a velocity having a component that is in the same direction as the force on the droplets 224 due to gravity. Performing the ink-jet printing top-down may allow for accurate and efficient deposition of the first material 210.

In the example of FIG. 4, the first (insulating) material 210 so printed is deposited onto and supported by the exposed portion or ledge 273 of the substrate layer 202. In this example, the printing nozzle 220 is angled with respect to the plane of the stack 200 so as to direct the droplets of ink 224 into a corner region of the cut 212 bounded by the exposed surfaces 274, 276 of the cathode and electrolyte layers 204, 206 and the ledge 273 provided by the substrate layer 202. This may allow for the first material 210, supported by the ledge 273, to build up against the exposed portions 274, 276 of the cathode and electrolyte layers 204, 206 so as to cover the exposed portions 274, 276 of the cathode and electrolyte layers 204, 206.

Once printed, the insulating ink 210 may be cured. For example, the insulating ink may be cured by evaporation of a carrier solvent of the insulating ink, which may occur at ambient temperatures, for example. As another example, the curing of the insulating ink may be facilitated by external curing means (not shown), for example by a heat source or an Ultra Violet (UV) light source (not shown), for example if curing of the insulating ink is facilitated thereby.

Depositing the first material 210 by inkjet material deposition, such as inkjet printing may allow flexible, efficient, and/or reliable deposition. For example, inkjet printing may allow for more flexible, efficient, and/or reliable deposition as compared to, say, thermal spray coating in which material is sprayed onto the stack at high temperatures and in vacuum. For example, thermal spray coating may rely on an edge of the stack to be exposed and to be substantially perpendicular to the direction of the spray in order to be covered, or otherwise on wetting of the material onto the edge. This may limit the arrangement of the stack or the layers of the stack, and may be unreliable. However, the relatively high degree of spatial and directional control provided by inkjet printing may allow for small regions of the stack to be accurately and reliably targeted, which may improve the flexibility and reliability of the deposition, and hence improve the efficiency of cell production therefrom. As another example, the high temperatures associated with thermal spray coating may deform or damage the stack or layers thereof. However, deposition by inkjet printing may be conducted at relatively low, for example ambient temperatures, and hence may reduce or prevent damage of the stack, thereby improving the efficiency of cell production. As another example, the vacuum conditions and/or high temperatures associated with thermal spray coating may be energy intensive and hence may result in uneconomic or inefficient deposition. However, inkjet printing may be performed at relatively low (e.g. ambient) temperatures and/or pressures, and hence may allow for an economic and/or efficient deposition and hence cell production.

Referring to FIG. 5, the first material 210 has been deposited as described with reference to FIG. 4, and a second material 214 is being deposited over the first material 210 and to form the second electrode layer 208 of the stack 200 (in this example the anode layer 208) and to provide an electrical connection from the second electrode layer 208 (in accordance with examples of step 205 of the method described with reference to FIG. 3).

The second material 214 is for forming the second electrode layer 208 and for electrically connecting the formed second electrode layer 208 to a further such second electrode layer (not shown in FIG. 4 or 5) via the second material 214. The first material 210 insulates (i.e. electrically insulates) the exposed portions 276, 274 of the first electrode layer 204 and the electrolyte layer 206 from the second material 214. Therefore, electrical connection of the second electrode layer 208 may be provided to other such second electrode layers (not shown) of further such stack portions or cells (not shown) via the second material 214 to allow for electrical connection of the cells in parallel, but without the second material 214 causing a short between the first electrode layer 204 and the second electrode layer 208 of the stack 200.

The second material 214 is for connecting (i.e. electrically connecting) the second electrode layer 208 to a further such second electrode layer (not shown in FIG. 4 or 5) via the second material 214. For example, the conductive material 214 may provide an electrical connection from the anode layer 208 to anode layers (not shown) of other cells, thereby to connect the anodes of the cells in parallel. The second material 214 may therefore form the positive terminal of an energy storage device comprising such cells. The first material 210 insulates (i.e. electrically insulates) the exposed portions 276, 274 of the cathode layer 204 and the electrolyte layer 206 from the second material 214, thereby preventing shorts between the anode layer 208 and the cathode layer 204. Therefore, electrical connection of the anode layers 208 of cells may be via the second material 214 to allow for electrical connection of the cells in parallel, but without the second material 214 causing a short between the anode layer 208 and the cathode layer 204. Connection of multiple cells may allow for the production of relatively large capacity energy storage devices. Connecting the cells in parallel may provide for an energy storage device that may have a relatively large discharge rate, which may be useful in some applications.

The second material 214 is an electrically conductive material. For example, the second material 214 may have an electrical resistance lower, for example substantially lower, than the first material 210. In any case, the second material 214 has an electrical conductivity sufficient to provide an effective electrical connection.

In this example, the second material 214 is or comprises anode material. For example, the second material 214 may be or comprise the same material as the anode layer 108 described with reference to FIG. 1. In some embodiments, the anode material 214 may comprise material to act as a negative electrode layer once deposited. For example, the anode material 214 may be or comprise one or more of Lithium metal, Graphite, Silicon or Indium Tin Oxides. In some embodiments, the anode 214 material may comprise material to act as a current collector once deposited. For example, the anode material may be or comprise nickel or other metals. In some embodiments where the anode layer 208 is to comprise a negative current collector and a separate negative electrode layer (not shown), depositing the second material 214 may comprise one or both of depositing negative electrode material and depositing negative current collector material, for example over the negative current electrode material, thereby to form the anode layer 208.

The second (anode) material 214 is deposited over the electrolyte layer 206. That is, in this example, the second (anode) material 214 is deposited over and supported by a second exposed surface, or ledge, 277 of the electrolyte layer 206, thereby to form the anode layer 208 of the stack. In other words, once the second (anode) material 208 is deposited over the electrolyte layer, the stack comprises a substrate layer 202, a cathode layer 204, and electrolyte layer 206, and a anode layer 208, where the electrolyte layer 206 is between the cathode layer 204 and the anode layer 208, and where the anode layer 208 is distal from the substrate layer 202 (i.e. the cathode layer 204 is proximal to the substrate layer 202. The second (anode) material 214 is also deposited over and supported by the first material 210 and the ledge 273 of the substrate layer 202.

The second (anode) material 214 may be deposited, for example, by vapour deposition process, for example by a physical vapour deposition process, for example by flood deposition, although other deposition methods may be used. For example, a deposition device 22b of the deposition apparatus 230 may be arranged to deposit 226b second (anode) material 214 over substantially the entire first side 200a of the stack 200.

The second (anode) material 214 is for connecting (i.e. electrically connecting) to a further such anode layer (not shown in FIG. 4 or 5) via the second material 214. For example, the conductive anode material 214 may provide an electrical connection from the formed anode layer 208 to anode layers (not shown) of other cells, thereby to connect the anodes of the cells in parallel. In this example, the second material 214 may therefore form the positive terminal of an energy storage device comprising such cells.

The first material 210 insulates (i.e. electrically insulates) the exposed portions 274, 276 of the cathode layer 204 and the electrolyte layer 206 from the second (anode) material 214, thereby preventing shorts between the anode layer 208 and the cathode layer 204. Therefore, electrical connection of the anode layers 208 of cells may be via the second material 214 to allow for electrical connection of the cells in parallel, but without the second material 214 causing a short between the anode layer 208 and the cathode layer 204.

Depositing anode material as the second material 214 may allow for efficient cell production. For example, depositing anode material so as to form the anode layer 208 may allow that the obtained stack 200 need not include an anode layer, and for the deposited anode material to form the anode layer 208. This may reduce the total amount of conductive material used in order to produce a cell from the stack 200, for example as compared to if a separate conductive material was added to an already formed anode layer in order to provide an electrical connection therefrom. As another example, the anode material may be relatively inexpensive. For example, the anode material may be inexpensive as compared to other materials that may be used to provide an electrical contact from an anode layer. As another example, anode material may be inexpensive as compared to cathode material. Therefore, providing an electrical connection for the anode layer 208 to other such anode layers of further cells using anode material may allow for the cost of the cell production to be reduced, and hence may allow for more efficient cell production. As another example, the deposition of anode material, for example by flood deposition, may be relatively fast/or and inexpensive, for example, as compared to other methods for depositing material. As another example, using the same or similar method and/or means to deposit the second (anode) material 214 as to form the layers of the obtained stack 200 may be efficient, for example as compared to providing separate methods and/or means for each function.

In the first example of FIGS. 4 and 5, the stack 200 has only one each of the electrolyte layer 206 and the cathode layer 204, supported on the substrate layer 202. It will be appreciated that this need not necessarily be the case, as described in more detail hereinafter with reference to FIGS. 6 and 7.

Figure 6:
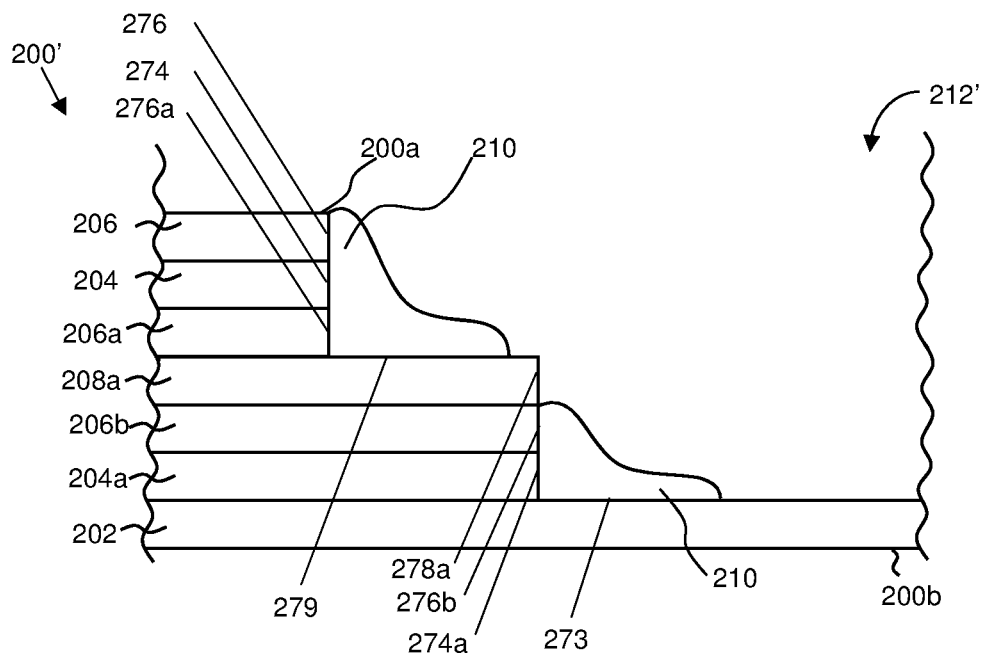
FIGS. 6 and 7 are schematic diagrams that illustrate one way of processing a stack according to some embodiments.

Referring to FIG. 6, there is illustrated a stack 200' (that may be obtained in accordance with examples of step 201 of the method described with reference to FIG. 3) according to a second example. The stack 200' may be similar to the stack 200 described with reference to FIG. 4, and so, for brevity, features that are the same will not be described in detail again. Like features are given like reference numerals.

The stack 200' of FIG. 6 differs from the stack 200 of FIG. 4 in that the stack 200' of FIG. 6 comprises a further second electrode layer 208a (in this example a further anode layer 208a), and a further electrolyte layer 206a between the further second electrode layer 208a and the first electrode layer (in this example the cathode layer 204). More specifically, in this example, the stack 200' comprises not only the substrate layer 202, the cathode layer 204, the electrolyte layer 206 and the anode layer 208 (once formed, see FIG. 7), but also a first further electrolyte layer 206a (over which the cathode layer 204 is deposited), a further cathode layer 204a (over which the first further electrolyte layer 206a is deposited), a second further electrolyte layer 206b (over which the further cathode layer 204a is deposited), and a further cathode layer 204a (over which the second further electrolyte layer 206b is deposited). The further cathode layer 204a is adjacent to the substrate layer 202, and the anode layer 208 is distal of the layers to the substrate layer 202.

The stack 200' of this second example may be referred to as "multi-stack" or a "multi-cell" stack in that the stack 200' has formed on one substrate layer 202 layers that may constitute multiple cells. For example, the cathode layer 204, the electrolyte layer 206 and the anode layer 208 (once formed) may constitute a first cell, the cathode layer 204, the first further electrolyte layer 206a and the further anode layer 208a may constitute a second cell, and the further anode layer 206a, the second further electrolyte layer 206b and the further cathode layer 204a may constitute a third cell of the mutli-cell stack 200'. That is, in these examples, the further anode layer 208a may act as an anode layer for both the second and third cells, and the cathode layer 204 may act as a cathode layer for both the first and second cells. This may be an efficient arrangement as it may allow for the amount of anode and/or cathode material required to form multiple cells to be reduced.

The cut 212' in the stack 200' of FIG. 6 is such that the cathode layer 204 and the electrolyte layer 206 and the first further electrolyte layer 206a are aligned and recessed from the further anode layer 208a such that the further anode layer 208a provides an exposed portion or surface or ledge 279. The cut 212' or groove is also such that further the anode layer 208a, the second further electrolyte layer 206b and the further cathode layer 204a are aligned and recessed from the substrate layer 202 so that the substrate layer 202 provides an exposed portion or surface or ledge 279. In this example, the cut 212' may be formed from plural cutting steps, for example by laser ablation using different and/or offset laser beams. For example, the cut 212' may be formed by firstly cutting the stack 200' to expose the portions 276, 274, 276a of the electrolyte layer 206, the cathode layer 204, and the first further electrolyte layer 206a, and the ledge 279 of the further anode layer 208a; and secondly cutting the stack 200' to expose the portions 274a, 276b, 278a of the further cathode layer 204a, the second further electrolyte layer 206b and the further anode layer 208a, and the ledge 273 of the substrate layer 202.

As with the stack 200 of FIG. 4, in the example of FIG. 6, the first material 210 is deposited over the exposed edges 274, 276 of the cathode layer 204 and the electrolyte layer 206. However, in this example, the first material is also deposited over the exposed portion 276a of the first further electrolyte layer 206a, and is supported by the ledge 279 of the further anode layer 208a. In the stack 200' of FIG. 6, first material 210 is also deposited over the exposed portions 276b, 274a of the second further electrolyte layer 206a and the further cathode layer 204a, and supported by the ledge 273 of the substrate layer 202. As a result, the exposed portion 278a of the further anode layer 208a remains exposed. The first material may be deposited, for example, by inkjet printing, for example as described with reference to FIGS. 4 and 5.

Figure 7:
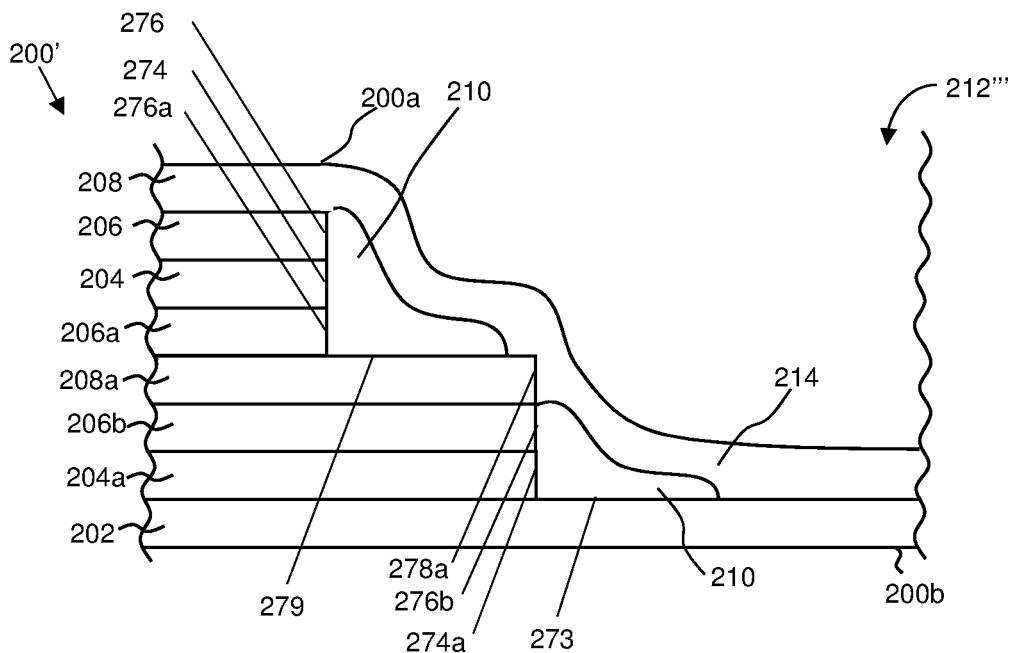

Referring to FIG. 7, as with the stack 200 of FIG. 5, second (anode) material 214 is deposited over the first material 210 and to form the second electrode layer (in this example the anode layer 208). However, in the stack 200' of FIG. 7, the second (anode) material 214 is deposited to contact the further second electrode layer (in this example the further anode layer 208). Specifically, the second material 214 is deposited so as to contact the exposed portion 278a of the further anode layer 278a. As a result the anode layer 208 and the further anode layer 208 are connected (electrically connected) via the second material 214. In this example, the second material 214 is at least partly supported by the ledge 279 of the further anode layer 208a and the ledge 273 of the substrate layer 202. The first material 210 electrically insulates the exposed portions 274, 276, 276a, 274a, 276b of the cathode layer 204, the electrolyte layer 204, the first further electrolyte layer 206a, the further cathode layer 204a, and the second further electrolyte layer 206b from the second material 214.

The second (anode) material 214 may be deposited in the same way as described above with reference to FIGS. 4 and 5, for example deposited using e.g. flood deposition.

The second (anode) material 214 provides an electrical connection from the anode layer 208 of the first and second cells of the multi-cell stack 200''' to the further anode layer 208a of the third cell of the multi-cell stack, thereby to connect the first to third cells in parallel. The second material 214 may therefore form the positive terminal of an energy storage device comprising such cells. The first material 210 insulates (i.e. electrically insulates) the exposed portions 274, 276, 276a, 274a, 276b of the cathode layer 204, the electrolyte layer 206, the first further electrolyte layer 206a, the further cathode layer 204a, and the second further electrolyte layer 206b from the second material 214, thereby preventing shorts between the anode layers 208, 208a and the cathode layers 204, 204a. Therefore, electrical connection of the anode layers 208, 208a of the cells may be via the second material 214 to allow for electrical connection of the cells in parallel, but without the second material 214 causing a short between the anode layers 208, 208a and the cathode layers 204, 204a.

Providing electrical connections between cells in a multi-cell stack 200' such as in FIGS. 6 and 7 may provide for efficient cell production. For example, the multi-cell stack 200' may reduce the amount of substrate layer 202 per cell, and hence may reduce cost associated with providing substrate layer 202. As another example, the second material 214 connecting multiple cells may be deposited in a single deposition, which may reduce time and hence cost, for example as compared to electrically connecting cells one by one.

It will be appreciated that although only three cells are provided in the multi-cell stack 200', in other examples, there may be more or less cells. For example, the multi-cell stack 200' may comprise a plurality of cells, where the stack 200' comprises at least the first electrode layer 204 an electrolyte layer 206, a second electrode layer 208, a further electrolyte layer 206a, 206b, and a further second electrode layer 208a.

It will be appreciated that although in the above examples the anode, electrolyte, and cathode layers 204, 204, 208, 204a, 206a, 208a, 206b where formed on the substrate layer 202 only towards the first side 200a the stack 200a, and that the deposition of the first material 210 and the second material 210 was performed only onto the first side 200a of the stack, this need not necessarily be the case and that in some examples anode, electrolyte, and cathode layers (not shown) may additionally be formed onto the substrate layer 202 towards the second side 200b of the stack. The additional layers (not shown) on the second side 200b of the substrate 202 may be, for example, a mirror image of the layers 204, 204, 208, 204a, 206a, 208a, 206b, including cuts 212, 212' in the layers, on the first side 200a of the substrate layer 202 in the first and/or second examples described.

In these embodiments, the first material 210 and the second material 214 may be deposited in the same or similar way to as described above with reference to FIGS. 3 to 7.

In the case of deposition of the first material 210 by inkjet material deposition such as inkjet printing, it may be beneficial to maintain the top-down arrangement for the inkjet material deposition, for example as described with reference to FIG. 4, even in the case where anode, electrolyte, and cathode layers are also formed on the second side 200b of the substrate layer 202.

Figure 8:
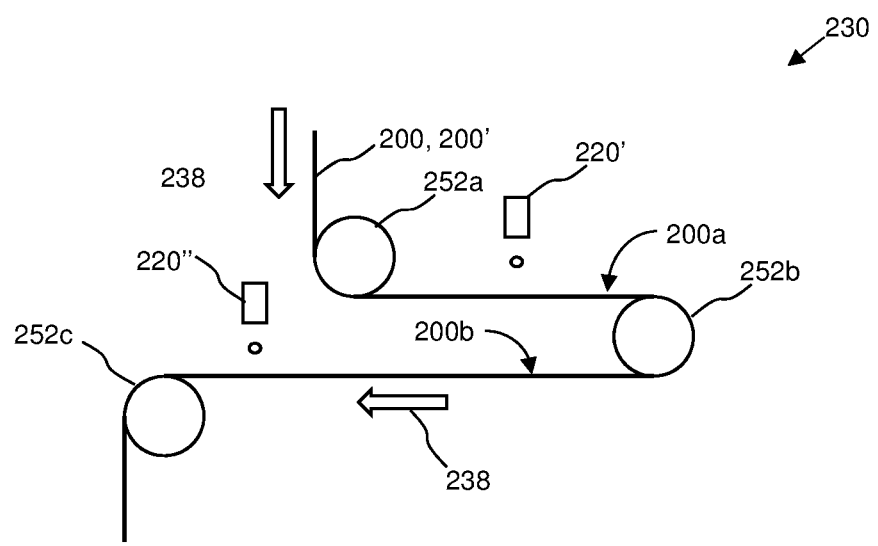
FIG. 8 is a schematic diagram that illustrates one way of implementing the processing according to either one of the first and second examples.

FIG. 8 illustrates schematically an example arrangement of the deposition apparatus 230 that facilitates top-down inkjet material deposition, such as inkjet printing, of the first material 210 onto a stack 200, 200' that has layers formed on both sides 200a, 200b of a substrate.

Referring to FIG. 8, the deposition apparatus 230 comprises rollers 252a, 252b, 252c arranged to guide movement of the stack 200, 200' such that a first side 200a of the stack 200, 200' is presented for top-down inkjet material deposition, such as inkjet printing, of the first material 210 from a first inkjet material deposition component, e.g. inkjet printing nozzle 220' and such that a second side 200b of the stack 200, 200' is presented for top-down inkjet material deposition, e.g. inkjet printing, of the first material 210 from a second inkjet deposition component, e.g. inkjet printing nozzle 220".

More specifically, as illustrated in FIG. 8, the stack 200, 200' travels over rollers 252a, 252b, 252c in a first direction of travel 238, for example as part of a reel-to-reel type process as described with reference to FIG. 2. The stack 200, 200' passing over and being tensioned between the first roller 252a and the second roller 252b causes the first side 200a of the stack 200, 200' to face upwards towards the first nozzle 220'. As the stack 200, 200' passes over the second roller 252b, the stack 200-, 200, 200' is inverted. The stack 200, 200' passing over and being tensioned between the second roller 252b and the third roller 252c causes the second side 200b of the stack 200, 200' to face upwards towards the second nozzle 220". In this way, top-down printing of the first material 210 may be provided in a reel-to-reel type process, which may for example be substantially continuous. This may provide for efficient cell production. Performing the inkjet printing top-down may allow for accurate and efficient deposition of the first material 210.

It will be appreciated that although in each of the above examples the first material 210 is described as being deposited by inkjet material deposition such as inkjet printing, this need not necessarily be the case, and in some examples the first material 210 may be deposited by methods other than inkjet material deposition.

It will be appreciated that a product of each of the examples described with reference to FIGS. 3 to 8 may be an intermediate product of an energy storage device production process, and that in some examples further processing may be performed on the stacks 200, 200' in order to produce the energy storage device.

In the various embodiments described above, this intermediate product takes the form of a stack 200, 200' for an energy storage device, the stack 200, 200' comprising a first electrode layer 204, a second electrode layer 208, and an electrolyte layer 206 between the first electrode layer 204 and the second electrode layer 208. The stack 200, 200' comprises a first material 210 over a portion 274 of the first electrode layer 204 (i.e. the portion 274 that would be exposed but for the first material 210 covering it) and a portion 276 of the electrolyte layer 206 (i.e. the portion 276 that would be exposed but for the first material 210 covering it). The stack comprises a second material 214 over the first material 210 and forming the second electrode layer 208, and to provide an electrical connection from the second electrode layer 208, for connecting to a further such second electrode layer 208a via the second material 214. The first material 210 insulates the exposed portions 274, 276 of the first electrode layer 204 and the electrolyte layer 206 from the second material 214.

The above embodiments are to be understood as illustrative embodiments of the disclosure. It is to be understood that any feature described in relation to any one example may be used alone, or in combination with other features described, and may also be used in combination with one or more features of any other of the embodiments, or any combination of any other of the embodiments. Furthermore, equivalents and modifications not described above may also be employed without departing from the scope of the disclosure, which is defined in the accompanying claims.

The invention claimed is:

1. A method comprising:
   obtaining a stack for an energy storage device, the stack comprising a first electrode layer, an electrolyte layer, a further second electrode layer, and a further electrolyte layer between the further second electrode layer and the first electrode layer, wherein the electrolyte layer, the first electrode layer, and the further electrolyte layer are recessed from an edge of the further second electrode layer such that the further second electrode layer provides a ledge on which at least one of a first material or a second material is/are deposited;
   depositing a first material over an exposed portion of the first electrode layer, an exposed portion of the electrolyte layer, and an exposed portion of the further electrolyte layer; and
   depositing a second material over the first material to form a second electrode layer of the stack, and to contact the further second electrode layer to provide an electrical connection from the second electrode layer to the further second electrode layer,
   wherein the electrolyte layer is between the first electrode layer and the second electrode layer;
   whereby the first material insulates the exposed portions of the first electrode layer the electrolyte layer, and the further electrolyte layer from the second material.

2. The method of claim 1, wherein depositing the first material comprises inkjet material deposition of the first material.

3. The method of claim 1, wherein the stack comprises a substrate proximal to one of the first electrode layer and the second electrode layer, wherein the other of the first electrode layer and the second electrode layer is an anode layer.

4. The method of claim 3, wherein the second material is anode material for forming the anode layer.

5. The method of claim 1, wherein the further second electrode layer is recessed from a substrate's edge so that the substrate provides a ledge portion on which at least one of the first material or the second material is/are at least partially supported.

6. The method of claim 1, wherein the method comprises laser ablating the stack, and wherein one or more of the exposed portions are exposed by the laser ablating of the stack.

* * * * *